Sept. 7, 1926.                                                1,598,782
                       F. A. OST
           FURNACE FOR HEATING GLASS DRAWING POTS
               Filed Nov. 15, 1924      2 Sheets-Sheet 1
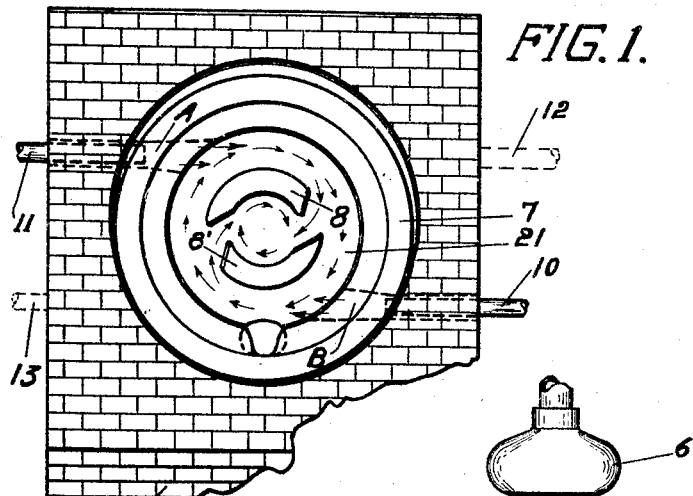
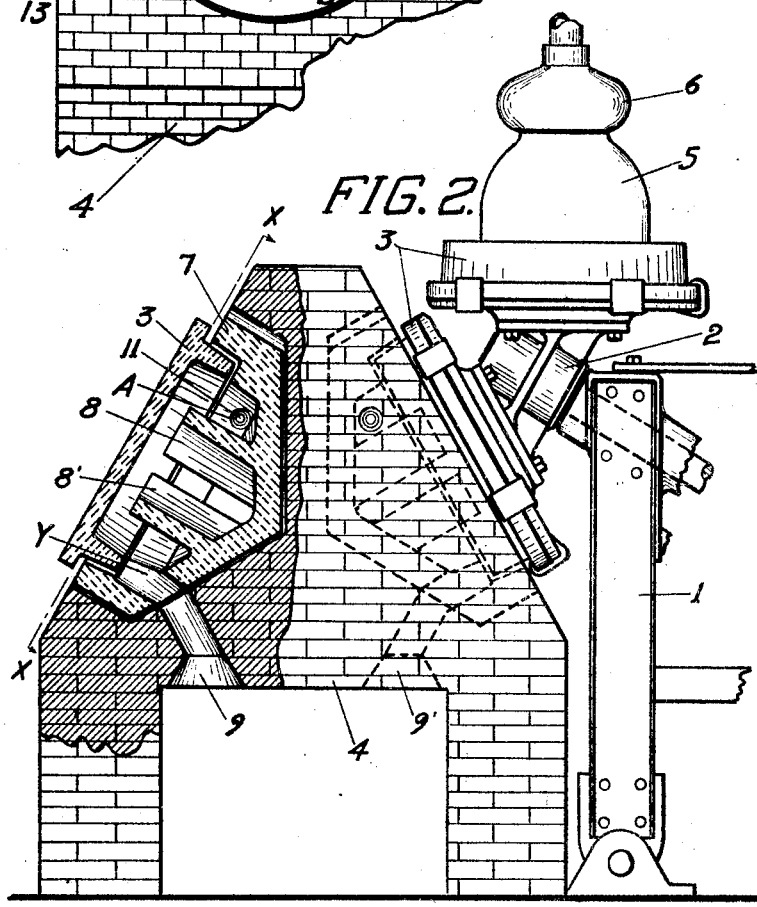
INVENTOR
Frederick A. Ost Sept. 7, 1926.
F. A. OST
1,598,782
FURNACE FOR HEATING GLASS DRAWING POTS
Filed Nov. 15, 1924   2 Sheets-Sheet 2
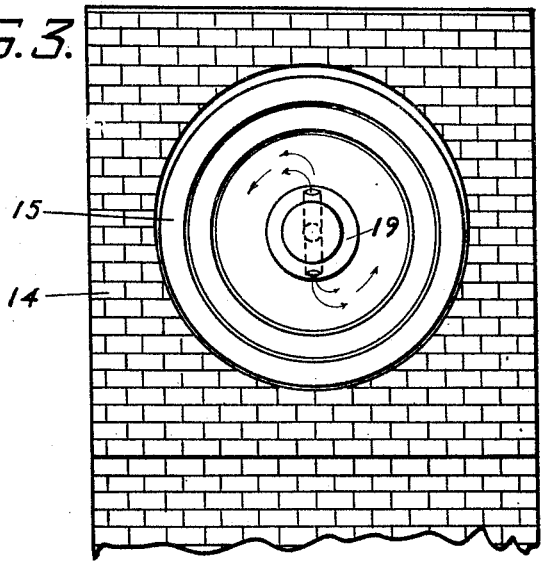
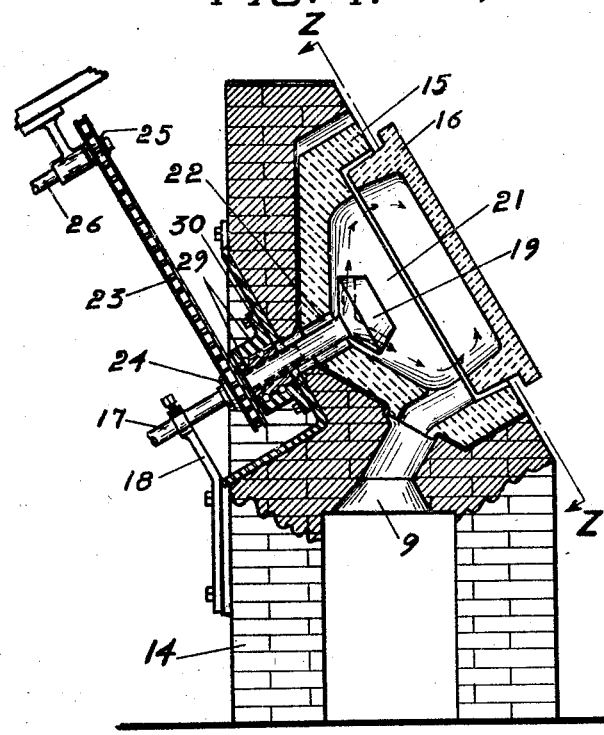
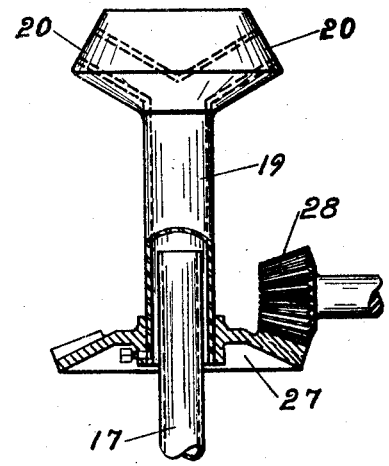
INVENTOR
Frederick A. Ost Patented Sept. 7, 1926.

1,598,782

UNITED STATES PATENT OFFICE.

FREDERICK A. OST, OF COFFEYVILLE, KANSAS.

FURNACE FOR HEATING GLASS-DRAWING POTS.

Application filed November 15, 1924. Serial No. 750,137.

My invention relates to improvements in furnaces for heating glass-drawing pots.

The primary object of this invention is to provide means whereby the fuel gases in a heating furnace may be rotated in a circular motion, thereby producing an even temperature to all parts of the cavity of a pot for drawing glass.

Another object is to provide a removable combustion chamber for furnaces used for heating glass-drawing pots.

A further object of the invention is to provide baffles in a furnace combustion-chamber to turn the heating medium into a circular motion for heating glass-drawing pots.

Other objects will hereinafter appear and, in order that the invention may be fully understood, reference will now be had to the accompanying drawings, in which:

Figure 1 is a side elevation of a furnace taken on line X—X of Fig. 2, the lower part being broken away, and the pot removed.

Fig. 2 is an elevation of the device showing a furnace with 2 oppositely disposed combustion chambers, one side being broken away showing the interior.

Fig. 3 is an elevation on line Z—Z of Fig. 4 the lower part being broken away, and the pot removed.

Fig. 4 is a broken side elevation of the invention in detail showing a modified form and different type of burner.

Fig. 5 is an enlarged detail of the burner shown in Fig. 4 but illustrating a different method of drive.

In drawing glass and using the process illustrated it is necessary to alterantely place the pots 3 in the combustion chamber of the furnace for heating and to drain the congealed glass therefrom, and also to heat the pot for the next drawing operation. In the present-day type of furnace, very little attention is paid to the burners and the combustion-chamber, with the result that the inside walls of the drawing-pots become extremely uneven in temperature causing the molten glass in the horizontal pot during the drawing operation to be more plastic at one side of the pot, thereby producing a thin glass in that side of the cylinder.

Referring more particularly to the drawings in which 1 denotes a part of a rockable frame carrying a rotary-head 2 at its upper end, to rotary-head 2 is secured drawing-pots 3, one of said pots 3 being inserted in furnace 4, which is its normal position, the companion pot being in horizontal position. 5 illustrates a glass cylinder partially drawn, and 6 a bait.

Furnace 4 as illustrated in Fig. 2 will disclose that a glass drawing operation can be performed at two opposite sides simultaneously, the broken portion showing a pot 3 cross-section in its normal position for heating same. 7 represents a removable hollow receptacle shown in cross-section and preferably made from refractory material with ports A and B in its side walls to admit the combustible gases to the inner portion which forms a combustion-chamber 21. In the lowermost corner of said combustion-chamber is located vent Y, and secured to the inner part of receptacle 7 are baffles 8 and 8' extending through combustion-chamber 21. Passages 9 and 9' are provided to allow glass, melted from pots 3, to drain from the combustion-chamber 21. Burners 10 and 11 are placed tangentially to the periphery of the combustion-chamber, and in a staggered position on the sides of the furnace 4. Another set of burners 12 and 13 as illustrated by dotted lines may also be used, but to get the desired results, only burners 10 and 11 can be used simultaneously, or burners 12 and 13 simultaneously. By this arrangement of the burners and the baffles 8 and 8' it will be apparent that the burning gases in the combustion-chamber will be forced into a rotary motion, thereby heating uniformly drawing-pots 3.

Referring to Fig. 4 which is a modified form of my invention carried out to the same result as that shown in Fig. 2, but with a different device. 14 represents a furnace with a single combustion-chamber in the form of receptacle 15 forming said combustion-chamber and shown in cross section, and which is also preferably made from refractory material. In this device the combustible gases enter through pipe 17 held in a stationary position by bracket 18, from pipe 17 the combustible gases pass through burner body 19 and out at openings 20 and 20' entering the combustion-chamber 21 as indicated by arrows in same. The receptacle 15 is formed with a cone shaped bottom and a recess in the uppermost edge of the combustion-chamber provides space for pots 16 to be entered, pot 16 also being shown in cross section. At the bottom of receptacle 15 is opening 22 for admitting burner 19 which is revolved by chain 23 through sprocket 24 securely fastened to burner 19, driving motion to chain 23 imparted by sprocket 25 and shaft 26 from any suitable source not here shown. Rotating the burner 19, may be accomplished also by using gearing as shown in a further modification in Fig. 5, in which bevel gear 27 is secured to body 19 and rotated by pinion 28. Again referring to Fig. 4 it will be seen that burner 19 is journalled on ball-bearings 29 carried by bracket 30. By applying motion to chain 23 the burner 19 will be rotated causing the burning gases to rotate in the combustion-chamber 21 thereby uniformly heating pots 16.

While I have shown and described the preferred form of my invention, I reserve the right to make such changes in the construction, combination and arrangement of parts as properly fall within the spirit and scope of the invention as claimed.

What I claim as new and desire to secure by Letters Patent is:

1. In a furnace of the character described, a removable combustion-chamber having its closed end cone-shaped, baffles in said combustion-chamber, burners entering the sides of said combustion-chamber for admitting a combustible fuel against said baffles, whereby the burning fuel is given a circular motion.

2. In a furnace for heating glass-drawing pots, a removable combustion-chamber having deflection ribs interiorly thereof for causing burning gases to rotate, substantially as described.

3. In a furnace for heating glass-drawing pots a plurality of burners arranged to cause the burning gases to rotate therein whereby the heat is evenly distributed to said drawing-pots.

4. In a furnace of the class described, a removable hollow receptacle forming a combustion-chamber, a recess in the inner periphery of said receptacle adapted to receive the cavity-portion of a drawing-pot.

5. In a furnace of the class described for heating glass-drawing pots, a removable hollow receptacle forming a combustion-chamber in said furnace, a vent in the lower part of said receptacle for the escape of burnt gases and residue glass.

6. In a furnace of the character described, glass-drawing pots arranged to be placed adjacent to said furnace for heating same, means within said furnace whereby the burning gases are caused to rotate in said furnace and said pots for uniformly heating same.

7. In a furnace for heating glass-drawing pots, burners arranged to cause the burning gases to rotate in a circular motion in the combustion-chamber of said furnace, and in the cavity of a drawing-pot when placed adjacent to said furnace.

8. In a furnace of the class described for heating glass-drawing pots, a lining for said furnace forming a combustion-chamber having a baffle integral therewith for imparting a continuous rotary motion to the burning gases.

9. In a furnace of the class described, a combustion-chamber having a set of burners so arranged that a continuous rotary motion in one direction is imparted to the burning gases, and another set of burners arranged to alternately reverse the rotary motion of the burning gases in an opposite direction.

10. In a furnace having a combustion-chamber for heating glass-drawing pots, a plurality of burners arranged tangentially to said combustion-chamber, whereby circular motion is imparted to the burning gases issuing therefrom.

In testimony whereof, I have hereunto set my hand.

FREDERICK A. OST.